(12) United States Patent
Wang (10) Patent No.: US 10,917,417 B2
(45) Date of Patent: Feb. 9, 2021

(54) METHOD, APPARATUS, SERVER, AND STORAGE MEDIUM FOR NETWORK SECURITY JOINT DEFENSE

(71) Applicant: PING AN TECHNOLOGY(SHENZHEN) CO., LTD., Guangdong (CN)

(72) Inventor: Yuanming Wang, Guangdong (CN)

(73) Assignee: PING AN TECHNOLOGY (SHENZHEN) CO., LTD., Guangdong (CN)

( * ) Notice: Subject to any disclaimer, the term of this patent is extended or adjusted under 35 U.S.C. 154(b) by 209 days.

(21) Appl. No.: 16/082,892

(22) PCT Filed: Aug. 30, 2017

(86) PCT No.: PCT/CN2017/099727
§ 371 (c)(1),
(2) Date: Sep. 6, 2018

(87) PCT Pub. No.: WO2018/107811
PCT Pub. Date: Jun. 21, 2018

(65) Prior Publication Data
US 2019/0098027 A1 Mar. 28, 2019

(30) Foreign Application Priority Data
Dec. 14, 2016 (CN) .......................... 2016 1 1156016

(51) Int. Cl.
*H04L 29/06* (2006.01)
(52) U.S. Cl.
CPC ...... *H04L 63/1416* (2013.01); *H04L 63/1408* (2013.01); *H04L 63/1425* (2013.01); *H04L 63/20* (2013.01)

(58) Field of Classification Search
CPC ............. H04L 63/1416; H04L 63/1408; H04L 63/1425
See application file for complete search history.

(56) References Cited

U.S. PATENT DOCUMENTS

| | | | | |
|---|---|---|---|---|
| 2006/0282893 | A1* | 12/2006 | Wu | ...................... H04L 63/1416 726/23 |
| 2015/0067866 | A1* | 3/2015 | Ibatullin | ............. H04L 63/1466 726/25 |

FOREIGN PATENT DOCUMENTS

| | | |
|---|---|---|
| CN | 102457475 A | 5/2012 |
| CN | 103581198 A | 2/2014 |

(Continued)

OTHER PUBLICATIONS

International Search Report for International Application No. PCT/CN2017/099727 dated Oct. 26, 2017.

*Primary Examiner* — Wasika Nipa
(74) *Attorney, Agent, or Firm* — Dorsey & Whitney LLP (57) ABSTRACT

A method for network security joint defense includes: obtaining security log information of security devices, wherein the security log information includes intrusion event information violating an own defense policy of the security device obtained by the security device in a network/system environment; converting log formats of the multiple obtained security log information into a preset log format, wherein the preset log format is a log format that is identifiable by the plurality of the security devices; classifying and summarizing the intrusion event information included in the converted security log information according to preset intrusion event types; obtaining a security device identification corresponding to each of preset intrusion event types; and pushing the intrusion event information corresponding to each preset intrusion event type to the security device corresponding to the security device identification, so that (Continued)

the security device adjusts the own defense policy thereof according to the pushed intrusion event information.

10 Claims, 5 Drawing Sheets

(56) References Cited

FOREIGN PATENT DOCUMENTS

| | | |
|---|---|---|
| CN | 103618692 A | 3/2014 |
| CN | 104883356 A | 9/2015 |
| CN | 105791289 A | 7/2016 |
| CN | 106209826 A | 12/2016 |
| CN | 106790023 A | 5/2017 |

* cited by examiner

METHOD, APPARATUS, SERVER, AND STORAGE MEDIUM FOR NETWORK SECURITY JOINT DEFENSE

This application claims priority to PCT International Application No. PCT/CN2017/099727, entitled "JOINT DEFENCE METHOD AND APPARATUS FOR NETWORK SECURITY, AND SERVER AND STORAGE" filed on Aug. 30, 2017, which claims priority to Chinese patent application No. 2016111560167, entitled "METHOD AND APPARATUS FOR NETWORK SECURITY JOINT DEFENSE" filed on Dec. 14, 2016, the contents of each of the foregoing applications are incorporated herein by reference in their entirety.

TECHNICAL FIELD

The present invention relates to the field of computer technology, and particularly relates to a method, an apparatus, a server and a storage medium for network security joint defense.

BACKGROUND

With the rapid development of Internet technology, enterprise operations, social activities and people's daily lives are inseparable from the Internet. To ensure the orderly operation of the above activities, it is necessary to strengthen the construction and maintenance of network security systems.

Traditional network security defense generally rely on existing security devices, such as vulnerability scanning devices, firewalls, and intrusion protection devices, etc. These security devices have limited security defense capabilities. Each security device has its own shortcomings that cannot be avoided, and the effect of security defense is unsatisfactory. Thus, how to achieve more satisfactory network security defense by using the traditional security devices becomes an urgent problem to be solved.

SUMMARY OF THE INVENTION

A method, an apparatus, a server and a storage medium for network security joint defense are provided according to various embodiments disclosed in the present application.

A method for network security joint defense includes:

obtaining security log information of a plurality of security devices, wherein the security log information includes intrusion event information violating an own defense policy of the security device obtained by the security device in a network/system environment;

classifying and summarizing the intrusion event information included in the security log information according to preset intrusion event types;

obtaining a corresponding relationship between each preset intrusion event type and a security device identification; and pushing the intrusion event information which is summarized according to the intrusion event types to the security device directed to by the security device identification having a corresponding relationship, so that the security device adjusts its own defense policy according to the pushed intrusion event information.

A method for network security joint defense includes:

detecting network/system state information and user behavior information in a network/system environment according to an own defense policy to generate security log information;

uploading the generated security log information to a security log sharing platform, wherein the security log sharing platform is configured to classify and summarize the uploaded security log information, to generate a plurality of event types of intrusion event information, and to push the plurality of event types of intrusion event information according to a preset rule;

receiving at least one of the event types of intrusion event information which is pushed by the security log sharing platform; and generating a joint defense policy by taking the received intrusion event information as clue information.

An apparatus for network security joint defense includes:

a security log information obtaining module, configured to obtain security log information of a plurality of security devices, wherein the security log information includes intrusion event information violating an own defense policy of the security device, obtained by the security devices in a network/system environment;

a log information classifying module, configured to classify and summarize the intrusion event information included in the security log information according to preset intrusion event types;

an associated information obtaining module, configured to obtain a corresponding relationship between each preset intrusion event type and a security device identification; and a log information pushing module, configured to push the intrusion event information which is summarized according to the intrusion event types to the security device directed to by the security device identification having a corresponding relationship, so that the security device adjusts its own defense policy according to the pushed intrusion event information.

An apparatus for network security joint defense includes:

a security log information generating module, configured to detect network/system state information and user behavior information in a network/system environment according to an own defense policy to generate security log information;

a security information sharing module, configured to upload the generated security log information to a security log sharing platform, wherein the security log sharing platform is configured to classify and summarize the uploaded security log information to generate a plurality of event types of intrusion event information, and to push the plurality of event types of intrusion event information according to a preset rule;

an event information receiving module, configured to receive at least one of the event types of intrusion event information which is pushed by the security log sharing platform; and a joint policy generating module, configured to generate a joint defense policy by taking the received intrusion event information as clue information.

A server includes a memory and a processor, and the memory stores computer executable instructions, which, when executed by the processor, cause the processor to perform following steps, including:

obtaining security log information of a plurality of security devices, wherein the security log information includes intrusion event information violating an own defense policy of the security device obtained by the security device in a network/system environment;

classifying and summarizing the intrusion event information included in the security log information according to preset intrusion event types;

obtaining a corresponding relationship between each preset intrusion event type and a security device identification; and pushing the intrusion event information which is summarized according to the intrusion event types to the security device directed to by the security device identification having a corresponding relationship, so that the security device adjusts its own defense policy according to the pushed intrusion event information.

One or more non-volatile readable storage medium storing computer executable instructions, which, when executed by one or more processors, cause the one or more processors to perform following steps, including:

obtaining security log information of a plurality of security devices, wherein the security log information includes intrusion event information violating an own defense policy of the security device obtained by the security device in a network/system environment;

classifying and summarizing the intrusion event information included in the security log information according to preset intrusion event types;

obtaining a corresponding relationship between each preset intrusion event type and a security device identification; and pushing the intrusion event information which is summarized according to the intrusion event types to the security device directed to by the security device identification having a corresponding relationship, so that the security device adjusts its own defense policy according to the pushed intrusion event information.

One or more non-volatile readable storage medium storing computer executable instructions, which, when executed by one or more processors, cause the one or more processors to perform following steps, including:

detecting network/system state information and user behavior information in a network/system environment according to an own defense policy to generate security log information;

uploading the generated security log information to a security log sharing platform, wherein the security log sharing platform is configured to classify and summarize the uploaded security log information, to generate a plurality of event types of intrusion event information, and to push the plurality of event types of intrusion event information according to a preset rule;

receiving at least one of the event types of intrusion event information which is pushed by the security log sharing platform; and generating a joint defense policy by taking the received intrusion event information as clue information.

Details of one or more embodiments of the present application are set forth in accompanying drawings and description below. Other features, purposes, and advantages will become apparent upon the description, the accompanying drawings and claims.

BRIEF DESCRIPTION OF DRAWINGS

To illustrate technical solutions according to the embodiments of the present application or in the prior art more clearly, the accompanying drawings for the description of the embodiments or the prior art will be briefly introduced below. Obviously, the accompanying drawings in the following description are only some embodiments of the present application, and ordinary personals skilled in the art can also derive other drawings according to these accompanying drawings without any creative effort.

DETAILED DESCRIPTION OF EMBODIMENTS

The present application will be further described in detail below with reference to the accompanying drawings and embodiments, so that the purposes, technical solutions and advantages of the present application will become clearer. It should be understood that the specific embodiments described herein are merely used to illustrate the present application but not intended to limit the present application.

Figure 1:
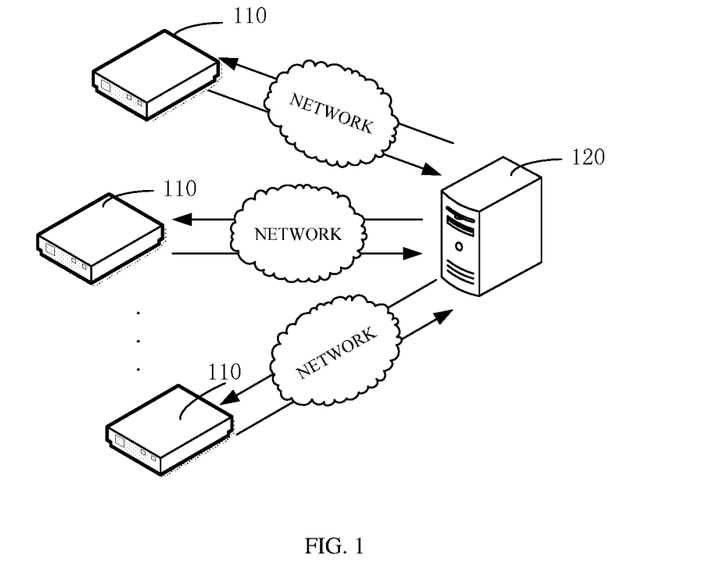
FIG. 1 is an application environment diagram of a method for network security joint defense in one embodiment.

As shown in FIG. 1, in one embodiment, an application environment diagram of a method for network security joint defense is provided. The application environment diagram includes a plurality of security devices 110 and a server capable of performing two-way communication with the security device 110. The security devices 110 may be a firewall security device, a hardware security device installed with an IDS (Intrusion Detection System) or an IPS (Intrusion Prevention System), a vulnerability scanning security device, and the like, which can perform security detection and protection for a system and network. The security devices can monitor user behavior or a system activity from a computer network or a computer server, analyze monitoring information under a rule of its own defense policy to obtain a security log recorded an intrusion event (including an intrusion detection event, an intrusion processing event, etc.) violating its own defense policy. Each security device uploads the obtained security log information to the server; the server summarizes and analyzes a plurality of the security logs, and returns intrusion event information belonging to one type to a corresponding security device to implement information sharing between the plurality of the security devices. The security devices will detect, locate and process the intrusion event more timely and accurately by using more abundant intrusion event information.

Figure 2:
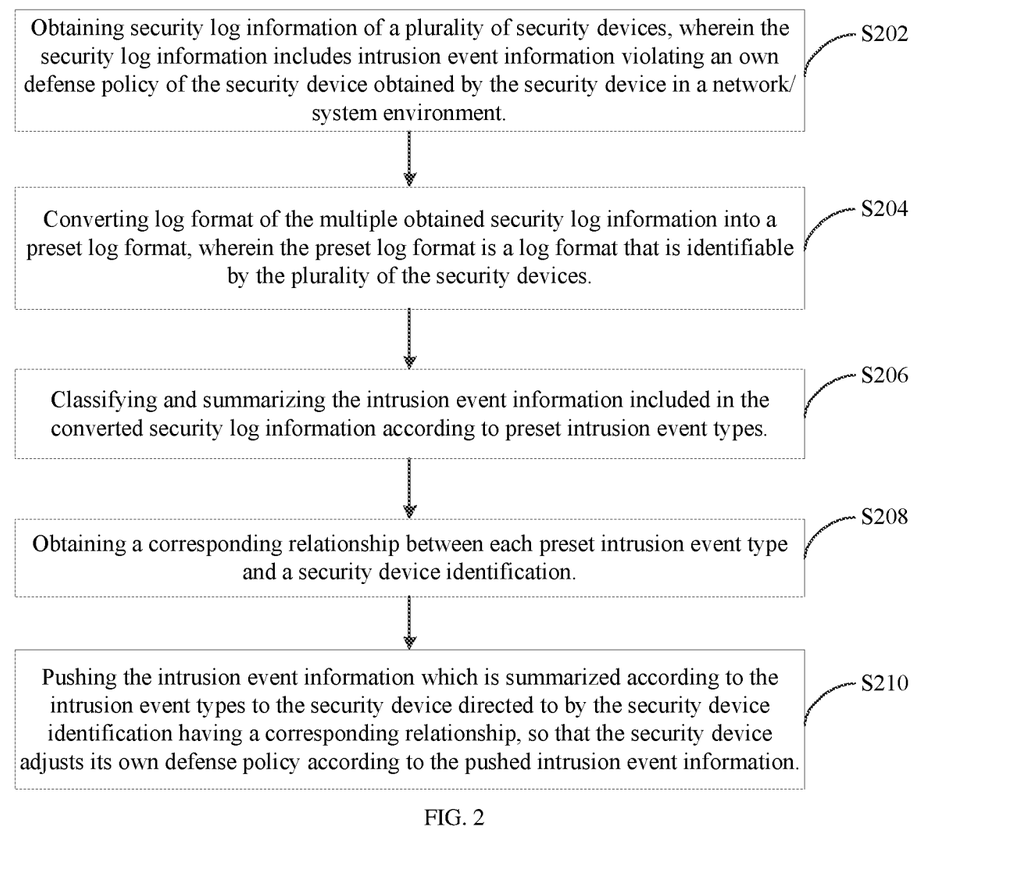
FIG. 2 is a flow diagram of a method for network security joint defense in one embodiment.

FIG. 2 is a flow diagram of a method for network security joint defense in one embodiment of the present application. It should be understood that, although each step in the flow diagram of FIG. 2 is sequentially shown as indications of arrows, these steps are not necessarily performed sequentially according to an order indicated by the arrows. Except as explicitly stated herein, these steps are not performed with a strict ordering limitation, and may be performed in other orders. Moreover, at least a part of the steps in FIG. 2 may include a plurality of sub-steps or stages, which are not necessarily performed sequentially, but may be in turns or alternately performed with at least a part of other steps or sub-steps or stages of other steps.

Referring to FIG. 2, a method for network security joint defense specifically includes the following steps:

Step S202: obtaining security log information of a plurality of security devices, wherein the security log information includes intrusion event information violating an own defense policy of the security device obtained by the security device in a network/system environment.

The security device refers to a device that can detect a behavior violating a security policy and an encountered assault sign from a network or a system in a network environment. The security device may include a firewall, an IDS (Intrusion Detection System), an IPS (Intrusion Prevention System), and a vulnerability scanning, etc. The firewall is installed at a boundary of different networks and is the only channel between networks or security domains with different security levels. Only the communication that is explicitly authorized by a firewall policy can pass through the channel. By collecting and analyzing the system, the network and the data, as well as the state and behavior of the user activity (such information is typically obtained from log files of the system and the network), the IDS identifies an attacking behavior, detects an abnormal condition, and carries out an abnormal warning. The IPS performs simple and quick attack detection and processes the detected attack in real time. The vulnerability scanning remotely detects vulnerability information existing on a target network or on a local host over the network.

The security log information includes the intrusion event information violating a preset defense policy of the security device in the network/system environment obtained by the security device through its own functions such as detection and defense. For example, for the firewall, the security information may be information of a detected access event which is denied in a firewall security policy; for the vulnerability scanning, the security log information may be the vulnerability information detected in the network and system environment; for the IDS and the IPS, the security log information may be an identified attack event or an abnormal event, and the security log information of the IPS also includes event processing information such as information of terminating a process, cutting off a connection and changing a file attribute, etc. The security log information of different security devices has different contents and log formats.

Step S204: converting log format of the multiple obtained security log information into a preset log format, wherein the preset log format is a log format that is identifiable by the plurality of the security devices.

The log formats of different security devices may be different. Before performing a statistic analysis for the security log information, it is necessary to unify the formats of the obtained security log information. The obtained different security log information is converted into the preset log format, and the preset log format is ensured to be identified by these security devices.

The format of the security log includes expressions and field formats. The expressions include a text expression, a binary expression, and other computer language expressions. Unifying the log format means that the expressions and the field formats are both unified.

In one embodiment, the security device may encrypt the security log information to be uploaded to the server, the server stores secret key information in advance, decrypts the encrypted security log information according to the secret key information, and then performs step S204. In another embodiment, before pushing the classified and summarized intrusion event information to the security device, the server may encrypt the pushed information to prevent the information from being changed during a network transmission process, and to avoid that the security detection and the security defense cannot be accurately performed by the security device.

Step S206: classifying and summarizing the intrusion event information included in the converted security log information according to preset intrusion event types.

The server presets the type of the intrusion event, such as a fuzzy intrusion event, an intrusion event that has detected an attack source, 'vulnerability information, and a processed intrusion event. System vulnerabilities can also be classified into the fuzzy intrusion event. In another embodiment, the type of the intrusion event can also be further refined.

Step S208: obtaining a corresponding relationship between each preset intrusion event type and a security device identification.

The security device is herein configured to include the vulnerability scanning security device, the IDS, the IPS, and the firewall. The server assigns a unique security device identification to each of the above security devices, and the server establishes the corresponding relationship between the classified intrusion event type and the security device identification in advance.

In one embodiment, the fuzzy intrusion event may be bound to the IDS and/or IPS security device identification so that the IDS and/or IPS security devices can further detect the intrusion event based on the fuzzy intrusion event information to locate the attack type and the attack source; the intrusion event in which the attack source is detected may be bound to the IPS security device identification so that the IPS carries out an attack processing response in time according to the explicit attack source information; and the intrusion event in which the attack source is detected may also be bound to the firewall security device identification so that the firewall updates a security defense policy and blocks a link corresponding to the intrusion event.

Step S210: pushing the intrusion event information which is summarized according to the intrusion event types to the security device directed to by the security device identification having a corresponding relationship, so that the security device adjusts its own defense policy according to the pushed intrusion event information.

According to a binding relationship between the intrusion event types and the security device, the intrusion event information corresponding to the relative intrusion event type is pushed to the security device with the binding relationship, so that the security device obtains more clues and adjusts the security defense policy according to the clues to detect and process the intrusion event more accurately and timely.

In this embodiment, a plurality of security devices upload the security log information detected by themselves during performing the security defense to a sharing platform. The sharing platform performs a readability format conversion and an overall analysis and classification on all security logs, and shares the statistic and analyzed security log information according to a set information sharing rule to the security device that can better realize the value of the security log information. The security device dynamically adjusts the security defense policy by taking the security log information pushed by the sharing platform as clue information, and implements quick and accurate locating of the attack event, thereby implementing a quick and effective processing of the attack event. The above multi-security device information sharing and joint defense greatly improve the accuracy and timeliness of the network security defense, and achieve better effect of security defense.

In one embodiment, the security device includes a fuzzy detection device and an attack detection device. The fuzzy detection device is configured to detect a fuzzy intrusion event. The attack detection device is configured to detect attack source information. The detected fuzzy intrusion event is associated with an attack detection device identification.

Specifically, both the fuzzy detection device and the attack detection device can detect the intrusion event information in the network and the system. The fuzzy intrusion event information is one of the intrusion event types preset by the server. Further, the fuzzy intrusion event information is a fuzzy intrusion event in which the attack information is inexplicit, that is, the fuzzy intrusion event is the intrusion event information that can be utilized by other security detection devices to generate explicit attack information.

Step S210: the pushing the intrusion event information which is summarized according to the intrusion event types to the security device directed to by the security device identification having a corresponding relationship, so that the security device adjusts its own defense policy according to the pushed intrusion event information includes:

pushing fuzzy intrusion event information to the attack detection device, so that the attack detection device generates an attack source joint detection policy according to the fuzzy intrusion event information, and the attack detection device detects the attack source information according to the attack source joint detection policy.

The server pushes the fuzzy intrusion event information detected by the fuzzy detection device to the attack detection device, and the attack detection device adjusts its own defense policy or generates a new detection policy according to the fuzzy intrusion event information. The updated or newly generated detection policy is a joint detection policy. The attack detection device performs further detection on the intrusion event information according to the generated joint detection policy to obtain the attack source information.

It should be illustrated that, after the joint detection policy is generated in this embodiment, the joint detection policy will be added to the security device to enhance the ability to detect the intrusion event of the security device, so that the security device can detect more intrusion events during the subsequent detection work, and generate a new joint detection policy. In this way, the detection performance of the security device is continuously enhanced.

For example, the fuzzy detection device is the vulnerability scanning security device, the fuzzy intrusion event information is vulnerability information in a system/application/network scanned by the vulnerability scanning security device, and the attack detection device is the IDS. The IDS generates the attack detection source policy for the vulnerability information, performs the attack source detection policy, and detects the attack source information that attacks the vulnerability. The attack source information of the vulnerability is detected by the IDS.

In this embodiment, the attack source information obtained by the attack detection device is substantially more detailed and explicit intrusion event information obtained by the joint cooperation between the fuzzy detection device and the attack detection device. The security devices cooperate mutually due to the sharing of the security device information, so that attack event can be detected more quickly and more accurately.

In one embodiment, the security device further includes an attack defense device, and the attack source information is associated with an attack defense device identification.

Specifically, the attack defense device refers to the security device capable of performing the attack event processing (such as terminating a process, cutting off a connection, changing a file attribute, and access restriction) to eliminate the harm of the attack event or reduce the impact of the attack event. In one embodiment, the attack defense device may be the IPS and the firewall, etc.

After the step of pushing fuzzy intrusion event information to the attack detection device, so that the attack detection device generates an attack source joint detection policy according to the fuzzy intrusion event information, and the attack detection device detects the attack source information according to the attack source joint detection policy, the method further includes: pushing the attack source information to the attack defense device, so that the attack defense device generates a joint defense policy according to the attack source information.

The server pushes to the attack defense device the attack source information that is obtained by the analysis of the joint cooperation and uploaded by the attack detection device, and the attack defense device generates a security defense policy for the attack source information. The security defense policy is substantially the joint defense policy generated according to the intrusion event information of a plurality of security devices, and the attack defense device performs more accurate and timely attack processing and defense by implementing the generated joint defense policy.

Figure 3:
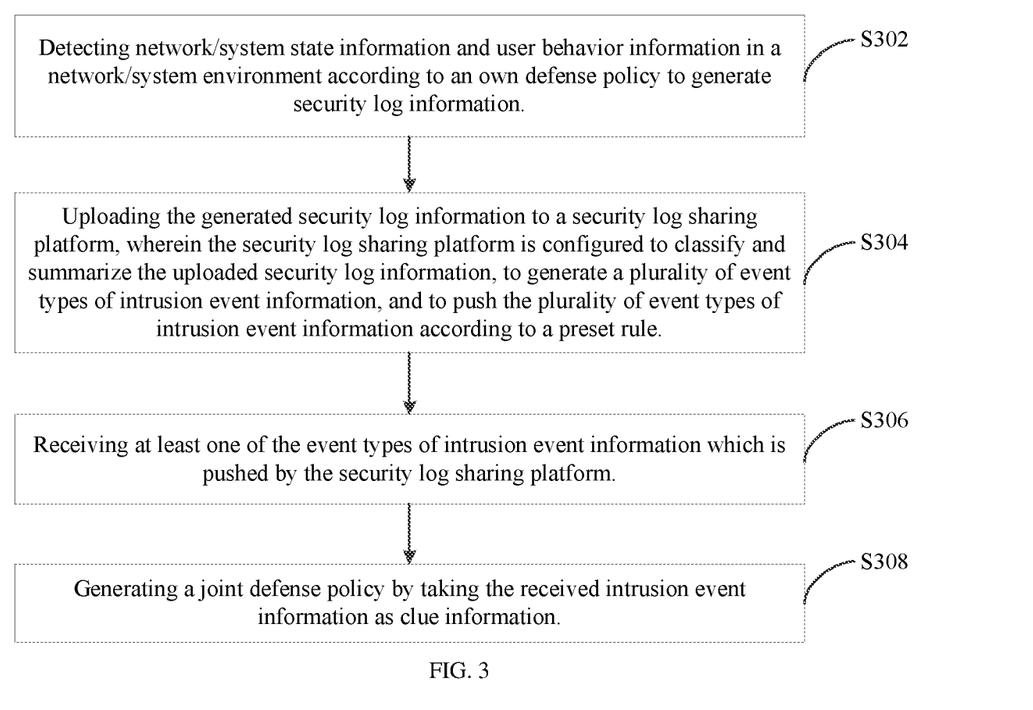
FIG. 3 is a flow diagram of a method for network security joint defense in another embodiment.

In one embodiment, as shown in FIG. 3, a method for network security joint defense is also provided. The method is illustrated by being applied to one of the security devices 110 as shown in FIG. 1, and specifically includes the following steps:

Step S302: detecting network/system state information and user behavior information in a network/system environment according to an own defense policy to generate security log information.

The security device refers to a device that can detect a behavior violating a security policy and an encountered assault sign from a network or a system in a network environment. The security device may include a firewall, an IDS (Intrusion Detection System), an IPS (Intrusion Prevention System), and a vulnerability scanning, etc.

The security device is configured with its own intrusion defense policy. It performs intrusion detection by implementing its own intrusion defense policy, generates intrusion event information that violates its own defense policy, and records the generated intrusion event information in a form of a security log.

Step S304: uploading the generated security log information to a security log sharing platform, wherein the security log sharing platform is configured to classify and summarize the uploaded security log information, to generate a plurality of event types of intrusion event information, and to push the plurality of event types of intrusion event information according to a preset rule.

Specifically, the security device uploads the generated security log information to the server at every set time, or the server automatically captures the security log information from the security device at every set time.

Step S306: receiving at least one of the event types of intrusion event information which is pushed by the security log sharing platform.

Step S308: generating a joint defense policy by taking the received intrusion event information as clue information.

In an embodiment, the log format of the obtained security log of each security device is converted by the server for consistency, and the converted log format is ensured to be identified by each security device. Further, the server performs a statistic analysis and classification on the security log information with a unitized format, and pushes the security log information (intrusion event information) of a set type to the set security device to realize fully sharing of the information. Each security device can perform mining, locating, defending, and disposing of the attacks more quickly and accurately according to the shared intrusion event information.

In this embodiment, the security device can obtain the security log information of other security devices through the sharing platform, and fully utilize the shared security log information for optimal adjustment of the security policy, so that the attack detection processing is more efficient and accurate, and the security defense capability of the security device is greatly improved.

In one embodiment, the generating a joint defense policy by taking the received intrusion event information as clue information in step S306 includes: associating the security log information generated by the security device itself with the received intrusion event information to generate joint security log information; and generating a joint defense policy according to the joint security log information, and implementing the joint defense policy to perform intrusion event detection and intrusion event defense.

Specifically, the security device can associate the intrusion events according to a time attribute in the security log information. In another embodiment, the joint security log information can be obtained by associating the events according to an address feature (such as IP) and a port information attribute.

The security device can generate the joint defense policy for the joint security log information, so that the attack detection processing is more efficient and accurate, and the security defense capability of the security device is greatly improved.

Figure 4:
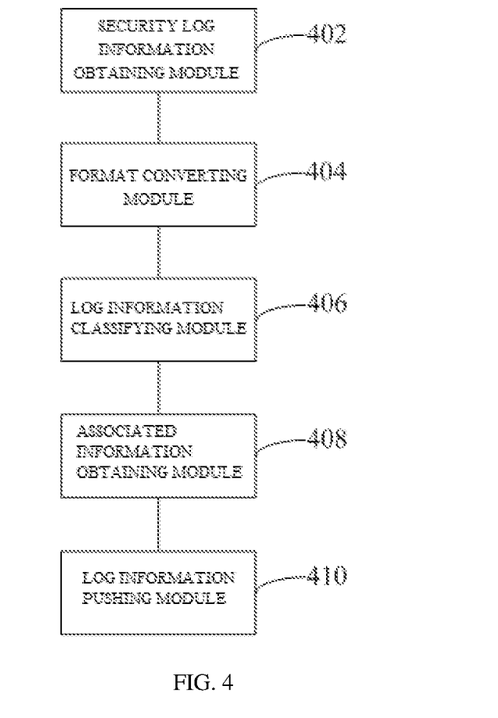
FIG. 4 is a structural block diagram of an apparatus for network security joint defense in one embodiment.

In one embodiment, as shown in FIG. 4, an apparatus for network security joint defense is provided, and the apparatus includes:

a security log information obtaining module 402, configured to obtain security log information of a plurality of security devices, wherein the security log information includes intrusion event information violating an own defense policy of the security device, obtained by the security devices in a network/system environment;

a format converting module 404, configured to convert log formats of the multiple obtained security log information into a preset log format, wherein the preset log format is a log format that is identifiable by the plurality of the security devices;

a log information classifying module 406, configured to classify and summarize the intrusion event information included in the converted security log information according to preset intrusion event type;

an associated information obtaining module 408, configured to obtain a corresponding relationship between each preset intrusion event type and a security device identification;

a log information pushing module 410, configured to push the intrusion event information which is summarized according to the intrusion event types to the security device directed to by the security device identification having a corresponding relationship, so that the security device adjusts its own defense policy according to the pushed intrusion event information.

In one embodiment, the security device includes a fuzzy detection device and an attack detection device, the fuzzy detection device is configured to detect a fuzzy intrusion event, the attack detection device is configured to detect attack source information, and the detected fuzzy intrusion event is associated with an attack detection device identification.

The log information pushing module 410 is further configured to push fuzzy intrusion event information to the attack detection device, so that the attack detection device generates an attack source joint detection policy according to the fuzzy intrusion event information, and the attack detection device detects the attack source information according to the attack source joint detection policy.

In one embodiment, the security device further comprises an attack defense device, and the attack source information is associated with an attack defense device identification.

The log information pushing module 410 is further configured to push the attack source information to the attack defense device, so that the attack defense device generates a joint defense policy according to the attack source information.

Figure 5:
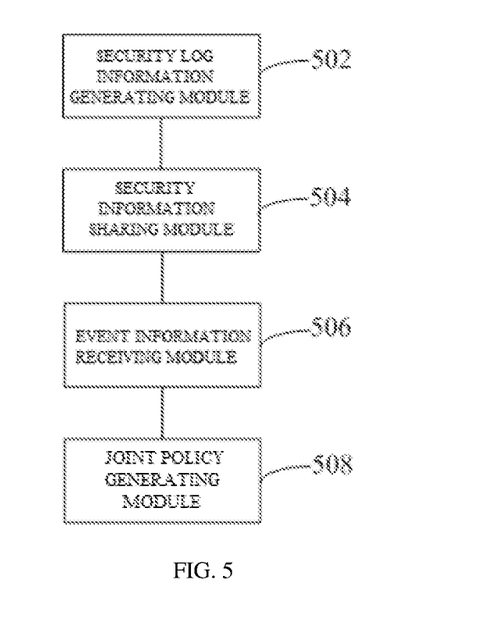
FIG. 5 is a structural block diagram of an apparatus for network security joint defense in another embodiment.

In one embodiment, as shown in FIG. 5, an apparatus for network security joint defense is provided, and the apparatus includes:

a security log information generating module 502, configured to detect network/system state information and user behavior information in a network/system environment according to an own defense policy to generate security log information;

a security information sharing module 504, configured to upload the generated security log information to a security log sharing platform, wherein the security log sharing platform is configured to classify and summarize the uploaded security log information to generate a plurality of event types of intrusion event information, and to push the plurality of event types of intrusion event information according to a preset rule;

an event information receiving module 506, configured to receive at least one of the event types of intrusion event information which is pushed by the security log sharing platform;

a joint policy generating module 508, configured to generate a joint defense policy by taking the received intrusion event information as clue information.

In one embodiment, the joint policy generating module 508 is further configured to associate the security log information generated by the security device itself with the received intrusion event information to generate joint security log information; and generate a joint defense policy according to the joint security log information, and implement the joint defense policy to perform intrusion event detection and intrusion event defense.

Figure 6:
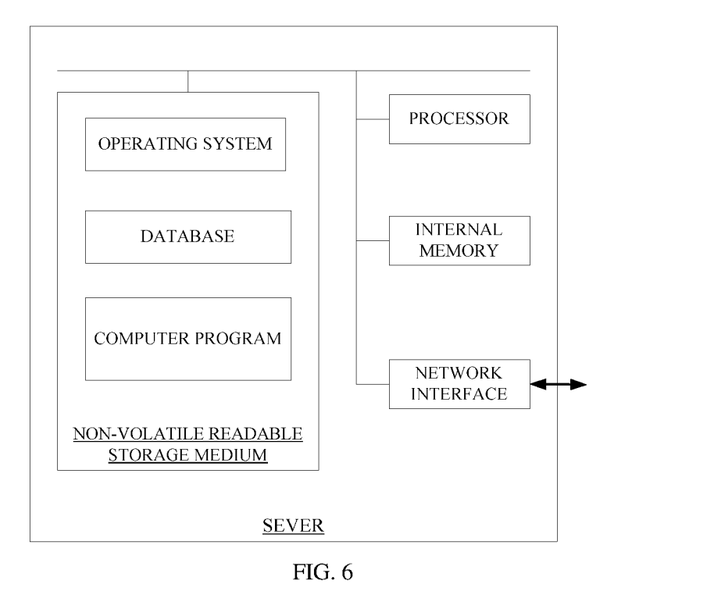
FIG. 6 is an internal structural schematic diagram of a server in one embodiment.

In one embodiment, a server is provided, and the internal structure of the server is shown in FIG. 6. The server includes a processor, a non-volatile storage medium, an internal memory, and a network interface which are coupled via a system bus. The non-volatile storage medium of the server stores an operating system, a database and at least one computer executable instruction, which may be executed by the processor. The database is configured to store data, such as storing collected business traffic data and so on. The processor is configured to provide computation and control capabilities to support the entire operation of the server. The internal memory of the server provides a cached operating environment for the operating system, the databases, and the computer executable instruction in the non-volatile storage medium. The network interface is configured to communicate with the security device over a network connection. A person skilled in the art should understand that, the structure of the server shown in FIG. 6 is only a part of the structure related to the solutions of the present application, which does not constitute limitation to the server that the solutions of the present application apply to. Specific server can include more or less components than those shown in the drawing, or can combine some components, or can have different component arrangement.

In one embodiment, a server is provided, and when the processor of the server executes the computer executable instructions in the memory, the processor of the server specifically performs the following steps, including: obtaining security log information of a plurality of security devices, wherein the security log information includes intrusion event information violating an own defense policy of the security device obtained by the security device in a network/system environment; classifying and summarizing the intrusion event information included in the security log information according to preset intrusion event types; obtaining a corresponding relationship between each preset intrusion event type and a security device identification; and pushing the intrusion event information which is summarized according to the intrusion event types to the security device directed to by the security device identification having a corresponding relationship, so that the security device adjusts its own defense policy according to the pushed intrusion event information.

In one embodiment, the processor further performs a following step, including: converting a log format of the obtained security log information into a preset log format, wherein the preset log format is a log format that is identifiable by the plurality of the security devices.

In one embodiment, the security device includes a fuzzy detection device and an attack detection device, the fuzzy detection device is configured to detect a fuzzy intrusion event, the attack detection device is configured to detect attack source information, and the detected fuzzy intrusion event is associated with an attack detection device identification.

The processor further performs a following step, including: pushing fuzzy intrusion event information to the attack detection device, so that the attack detection device generates an attack source joint detection policy according to the fuzzy intrusion event information, and the attack detection device detects the attack source information according to the attack source joint detection policy.

In one embodiment, the security device further includes an attack defense device, and the attack source information is associated with an attack defense device identification.

The processor further performs a following step, including: pushing the attack source information to the attack defense device, so that the attack defense device generates a joint defense policy according to the attack source information.

Figure 7:
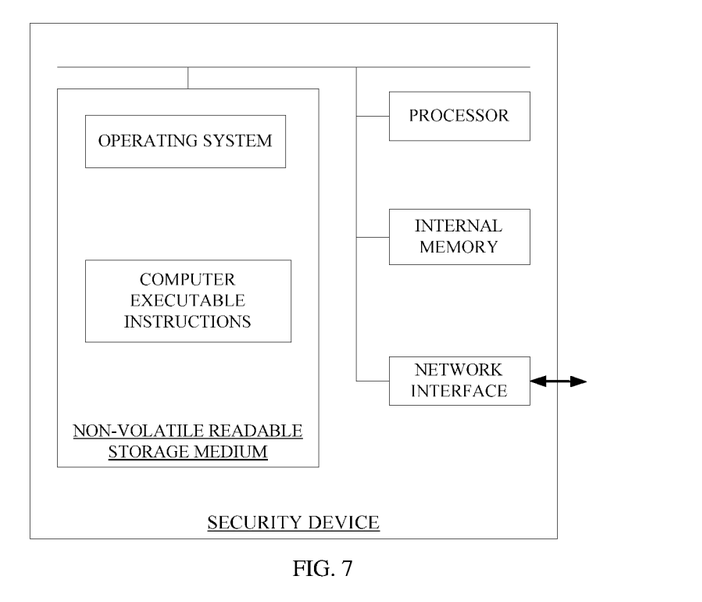
FIG. 7 is an internal structural schematic diagram of a security device in one embodiment.

In one embodiment, a security device is provided, and the internal structure of the security device is shown in FIG. 7. The security device includes a processor, a non-volatile storage medium, an internal memory, and a network interface which are coupled via a system bus. The non-volatile storage medium of the security device stores an operating system and at least one computer executable instruction, which may be executed by the processor. The processor is configured to provide computation and control capabilities to support the entire operation of the security device. The internal memory of the security device provides a cached operating environment for the operating system and the computer executable instruction in the non-volatile storage medium. The network interface is configured to communicate with the server shown in FIG. 6 over a network connection. A person skilled in the art should understand that, the structure of the server shown in FIG. 7 is only a part of the structure related to the solutions of the present application, which does not constitute limitation to the server that the solutions of the present application apply to. A particular server can include more or less components than those shown in the drawing, or can combine some components, or can have different component arrangement.

In one embodiment, a security device is provided, and when the processor of the security device executes the computer executable instructions in the memory, the processor of the security device specifically performs the following steps, including: detecting network/system state information and user behavior information in a network/system environment according to an own defense policy to generate security log information; uploading the generated security log information to a security log sharing platform, wherein the security log sharing platform is configured to classify and summarize the uploaded security log information, to generate a plurality of event types of intrusion event information, and to push the plurality of event types of intrusion event information according to a preset rule; receiving at least one of the event types of intrusion event information which is pushed by the security log sharing platform; and generating a joint defense policy by taking the received intrusion event information as clue information.

In one embodiment, the generating a joint defense policy by taking the received intrusion event information as clue information performed by the processor includes: associating the security log information generated by the security device itself with the received intrusion event information to generate joint security log information; and generating a joint defense policy according to the joint security log information, and implementing the joint defense policy to perform intrusion event detection and intrusion event defense.

Each of the above modules may be implemented in all or in part by software, hardware, and combinations thereof. The network interface may be an Ethernet card or a wireless network card. Each of the above modules may be embedded in or independent of the processor in the server and the security device in a form of hardware, or may be stored in the memory in the server and the security device in a form of software, which is easy to be called by the processor to perform the operation corresponding to each of the above modules. The processor can be a central processing unit (CPU), a microprocessor, a single chip microcomputer, or the like.

In one embodiment, one or more non-volatile readable storage medium storing computer executable instructions is provided, and the instructions, when executed by one or more processors, cause the one or more processors to perform all or part of the processes of the methods of the above embodiments. The above computer executable instructions are computer executable instructions corresponding to computer programs implemented by all or part of the processes of the methods in the various embodiments described above.

A person skilled in the art should understand that the processes of the methods in the above embodiments can be, in all or in part, implemented by computer executable instructions instructing related hardware. The program can be stored in a computer readable storage medium, for example, in the embodiment of the present application, the program can be stored in a non-volatile readable storage medium of the computer system and executed by at least one processor of the computer system to implement the processes of the embodiments including the above methods. The non-volatile readable storage medium may be a magnetic disk, an optical disk, and a read-only memory (ROM) and the like.

The technical features of the above embodiments may be combined arbitrarily. To simplify the description, all the possible combinations of the technical features in the above embodiments are not described. However, all of the combinations of these technical features should be considered as within the scope of the description, as long as these combinations of the technical features have no collision with each other.

The above embodiments merely represent several embodiments of the present application, and the description thereof is specific and detailed, but it should not be interpreted as limiting the scope of the invention. It should be noted that, for a person skilled in the art, several variations and improvements may be made without departing from the concept of the present application, and these are all within the protection scope of the present application. Therefore, the protection scope of the present application shall be subject to the appended claims.

The invention claimed is:

1. A method for network security joint defense, the method comprising:
    obtaining security log information for each security device of a plurality of security devices, each security device of the plurality of security device being configured to detect an intrusion event and having an own defense policy and a unique security device identification assigned thereto, a first security device of the plurality of security devices being configured to detect a different type of intrusion event than a second security device of the plurality of security devices, wherein the security log information for at least the first security device includes intrusion event information of the intrusion event detected by the first security device violating the own defense policy of the first security device obtained by the first security device in a network/system environment;
    classifying and summarizing the intrusion event information included in the security log information according to one or more preset intrusion event types;
    obtaining a corresponding relationship between each of the one or more preset intrusion event types as classified based on the intrusion event information and at least one unique security device identification assigned to at least the second security device of the plurality of security devices; and
    pushing the intrusion event information which is summarized according to the one or more preset intrusion event types to at least the second security device directed to by the at least one unique security device identification having the corresponding relationship to the one or more preset intrusion event types, so that the second security device adjusts the own defense policy thereof according to the pushed intrusion event information;
    wherein the first security device includes a fuzzy detection device and the second security device includes an attack detection device, the fuzzy detection device is configured to detect a fuzzy intrusion event, the attack detection device is configured to detect attack source information, and the at least one unique security device identification is an attack detection device identification corresponding to the fuzzy intrusion event detected by the fuzzy detection device;
    wherein the pushing the intrusion event information which is summarized according to the one or more preset intrusion event types to the at least one security device directed to by the at least one unique security device identification having the corresponding relationship to the one or more preset intrusion event types, so that the at least one security device adjusts the own defense policy thereof according to the pushed intrusion event information further includes:
        pushing the fuzzy intrusion event information to the attack detection device, so that the attack detection device generates an attack source joint detection policy according to the fuzzy intrusion event information, and the attack detection device detects the attack source information according to the attack source joint detection policy.

2. The method according to claim 1, wherein after obtaining the security log information of each security device of the plurality of security devices, the method further comprises:
    converting log formats of the security log information obtained from at least a portion of the plurality security devices into a preset log format, wherein the preset log format is identifiable by each security device of the plurality of security devices.

3. The method according to claim 2, wherein the first security device comprises a fuzzy detection device and the second security device includes an attack detection device, the fuzzy detection device is configured to detect a fuzzy intrusion event, the attack detection device is configured to detect attack source information, and the at least one unique security device identification is an attack detection device identification corresponding to the fuzzy intrusion event detected by the fuzzy detection device;
    the pushing the intrusion event information which is summarized according to the one or more intrusion event types to at least the second security device directed to by the at least one unique security device identification having the corresponding relationship to the one or more preset intrusion event types, so that the second security device adjusts the own defense policy thereof according to the pushed intrusion event information further comprises:
    pushing the fuzzy intrusion event information to the attack detection device, so that the attack detection device generates an attack source joint detection policy according to the fuzzy intrusion event information, and the attack detection device detects the attack source information according to the attack source joint detection policy.

4. The method according to claim 3, wherein the plurality of security device further comprises an attack defense device, and the attack source information is associated with an attack defense device identification;
    the pushing the intrusion event information which is summarized according to the one or more intrusion event types to at least the second security device directed to by the at least one unique security device identification having the corresponding relationship to the one or more preset intrusion event types, so that the security devices adjusts the own defense policy thereof according to the pushed intrusion event information further comprises:
    pushing the attack source information to the attack defense device, so that the attack defense device generates a joint defense policy according to the attack source information.

5. The method according to claim 1, wherein the plurality of security devices include an attack defense device, and the attack source information is associated with an attack defense unique device identification;
    the pushing the intrusion event information which is summarized according to the one or more intrusion event types to the at least one security device directed to by the at least one unique security device identification having the corresponding relationship to the one or more preset intrusion event types, so that the at least one security device adjusts the own defense policy thereof according to the pushed intrusion event information further comprises:
        pushing the attack source information to the attack defense device, so that the attack defense device generates a joint defense policy according to the attack source information.

6. A server, comprising:
a memory; and
a processor,
wherein the memory stores computer executable instructions, which, when executed by the processor, cause the processor to perform following steps, comprising:
obtaining security log information for each security device of a plurality of security devices, each security device of the plurality of security device being configured to detect an intrusion event and having an own defense policy and a unique security device identification assigned thereto, a first security device of the plurality of security devices being configured to detect a different type of intrusion event than a second security device of the plurality of security devices, wherein the security log information for at least the first security device includes intrusion event information of the intrusion event detected by the first security device violating the own defense policy of the first security device obtained by the first security device in a network/system environment;
classifying and summarizing the intrusion event information included in the security log information according to one or more preset intrusion event types;
obtaining a corresponding relationship between each of the one or more preset intrusion event types as classified based on the intrusion event information and at least one unique security device identification assigned to at least the second security device of the plurality of security devices; and
pushing the intrusion event information which is summarized according to the one or more intrusion event types to at least the second security device directed to by the at least one unique security device identification having the corresponding relationship to the one or more preset intrusion event types, so that the second security device adjusts the own defense policy thereof according to the pushed intrusion event information,
wherein the first security device includes a fuzzy detection device and the second security device includes an attack detection device, the fuzzy detection device is configured to detect a fuzzy intrusion event, the attack detection device is configured to detect attack source information, and the at least one unique security device identification is an attack detection device identification corresponding to the fuzzy intrusion event detected by the fuzzy detection device;
wherein the pushing the intrusion event information which is summarized according to the one or more preset intrusion event types to the at least one security device directed to by the at least one unique security device identification having the corresponding relationship to the one or more preset intrusion event types, so that the at least one security device adjusts the own defense policy thereof according to the pushed intrusion event information further includes:
    pushing the fuzzy intrusion event information to the attack detection device, so that the attack detection device generates an attack source joint detection policy according to the fuzzy intrusion event information, and the attack detection device detects the attack source information according to the attack source joint detection policy.

7. The server according to claim 6, wherein the processor further performs a following step, comprising: converting log formats of the multiple obtained security log information obtained from at least a portion of the plurality of security devices into a preset log format, wherein the preset log format is a log format that is identifiable by each security device of the plurality of the security devices.

8. The server according to claim 7, wherein the first security device comprises a fuzzy detection device and the second security device includes an attack detection device, the fuzzy detection device is configured to detect a fuzzy intrusion event, the attack detection device is configured to detect attack source information, and the at least one unique security device identification is an attack detection device identification corresponding to the fuzzy intrusion event detected by the fuzzy detection device;
    the processor further performs a following step, comprising:
        pushing fuzzy intrusion event information to the attack detection device, so that the attack detection device generates an attack source joint detection policy according to the fuzzy intrusion event information, and the attack detection device detects the attack source information according to the attack source joint detection policy.

9. The server according to claim 8, wherein the plurality of security devices further comprises an attack defense device, and the attack source information is associated with an attack defense device identification;
    the processor further performs a following step, comprising:
        pushing the attack source information to the attack defense device, so that the attack defense device generates a joint defense policy according to the attack source information.

10. The server according to claim 6, wherein the plurality of security device devices further comprises an attack defense device, and the attack source information is associated with an attack defense device identification; the processor further performs a following step, comprising: pushing the attack source information to the attack defense device, so that the attack defense device generates a joint defense policy according to the attack source information.

* * * * *